3,576,689
METHOD FOR PRODUCING A PICTURE WITH A LENTICULAR SCREEN

Shoji Uraushihara, Tokyo, Japan, assignor to Toppan Printing Company, Limited, Tokyo, Japan
Filed Oct. 30, 1968, Ser. No. 771,932
Int. Cl. B32b 31/00
U.S. Cl. 156—219                                     6 Claims

ABSTRACT OF THE DISCLOSURE

A method for producing a stereoscopic or variable picture with a lenticular screen which consisting of applying a coating layer on a base sheet, printing specific linear or dotted images on said coated base sheet, applying an adhesive layer on said printed base sheet, adhering said sheet onto the backside of a lenticular screen, and peeling off said base sheet from said coating layer, wherein the picture produced having characteristics that it is thin in the thickness, and the positioning of said printed images against the lenticular screen can be carried out easily and accurately.

---

The present invention relates to a method for producing a picture with a lenticular screen in which relative positions between a plurality of cylindrical lenticular screen lenses provided on its surface and linear images printed on its back are caused to coincide with each other at an extremely high accuracy.

The lenticular screen has been used, as previously known, by adhering to the back thereof the paper on which a variable, a movable, or a stereoscopic linear image obtained by a special photographing process being printed. However, if said lenticular screen and printed linear image sheet are pasted together in disregard of the relative position existing between both the linear image and the lenticular screen, it is impossible to obtain variable, movable or stereoscopic picture in good condition. The word hereinafter used "picture" includes drawings, photographic pictures, patterns, letters, indicators and the like.

Said relative position occurs when a linear photographic image is provided by a special photographing process employing a lenticular screen in a certain dimension. An object is photographed as linear images by way of a plurality of cylindrical lenses, i.e., lenticular screen and a plurality of linear images of different positions of the object to be photographed are provided beneath each line of the cylindrical lenses. For example, in the case of a certain stereoscopic photograph, there is included six linear images in the each 0.42 mm. pitch of the cylindrical lens, adjoining each other, and the linear images present the stereoscopic figure of the object taken when viewed through the lenticular screen.

Accordingly, it will be understood that a clear and accurate stereoscopic figure may be obtained only when the lenticular screen and paper on which a predetermined linear image is printed, are attached together in a high accuracy. The preparation would be extremely inconvenient with the fact that when the paper is employed as the material to be printed, either the pitch of both the linear images and lenticular screen are not coincided with each other owing to the difference of elasticities of the paper and lenticular screen made of synthetic resin, further the said picture sheet is naturally bent down in accordance with the condition of the air (moisture, temperature) because said sheet is made of the paper and synthetic resin sheet, and however, the utilization of said sheet would be limited to display and the like, since it has no flexibility and being thick because the paper and synthetic resin sheet are pasted together.

An object of the present invention is to provide a novel method for producing a stereoscopic or variable picture with a lenticular screen which the positioning of a photographic linear image to the cylindrical lens is achieved more easier in commercial production.

Other object of the present invention is to provide a method for producing said picture sheet, in which a sheet to be printed which has been pasted together with a lenticular screen in a prior art, is employed only as a carrier sheet for the printing image which is attached to the backside of the lenticular screen, and thereby said picture can be produced more thinner in its thickness and good in flexibility.

A still other object of the present invention is to provide a method for producing said picture in which a coating layer is provided on the layer of a specific photographic image which is pasted on the backside of the lenticular screen and further any inconvenience is not occurred even when there is no backing paper.

The method according to the present invention to accomplish said objects is characterized in that there is provided on the base sheet to be printed coating layer being provided with peeling property and a high average of printability, a specific linear or dotted photographic image (hereinafter referred to as "image element") being printed thereon, the printed sheet is pasted together on the backside of the lenticular screen by using an adhesive and thereafter said base sheet is peeled off at the coating layer.

The sheet to be printed being used in the method of the present invention is composed of such material as porous surface-processed polystyrene sheet, polyester sheet or the like being used for such as transcription, or surface-processed metallic plate. When polystyrene or polyester sheet is employed as a printing sheet, it is suitable in the treatment with the fact that it has a good printability, has no expansion and no contraction, and further having proper stiffness similar to that of the paper and these sheets can be easily produced by adding a small amount of blowing agent.

When the printing paper is composed of a metallic plate, it has such an advantage that it is possible to use as the printing sheet repeatedly after the peeling off from the lenticular screen, because it has endurance as compared with the plastic sheet.

Furthermore, the coating layer may be a hot-peelable or a cold-peelable one. As for the method of attaching the printed sheet onto the backside of the lenticular screen, there are two methods that the one is attaching the printed sheet with proper adhesive onto the backside of a lenticular screen being previously provided with cylindrical lenses, and another one is attaching the printed sheet onto the lenticular screen material with adhesive and after the adhesion cylindrical lenses are formed on said lenticular screen material.

The picture with lenticular screen being produced in accordance with the method of the present invention can be made thin in the thickness by peeling off the base sheet of said printed sheet, and it is suitable for attaching it onto the surfaces of utensils of daily use, further anything can be drawn by a fountain pen or the like on the back surface, therefore, it can be available for post-cards or other cards and the like. And further, it has no backing paper being peeled off, so that it does not curl itself and peeling of backing paper does not happen. Still further, if red, yellow and blue linear images are provided in each pitch of the cylindrical lens, the appearance will be seen as similar as the rainbow, and it can be used as decorative materials such as tape, braid for Christmas decorations, and the like by cutting said picture into narrow pieces.

Hereinafter, the method according to the present invention will be described referring to the accompanying drawings, in which.

Figure 1:
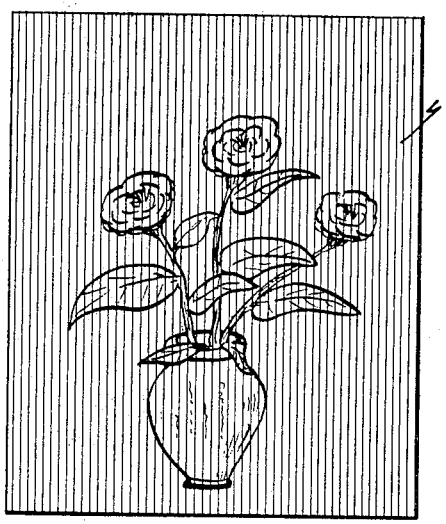
FIG. 1 is a plan view of a picture sheet with lenticular screen.
Figure 2:
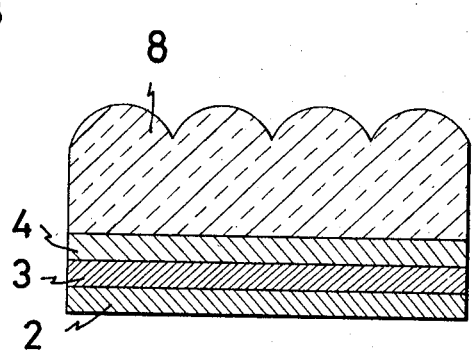
FIG. 2 is a partial vertical sectional view of said picture sheet.
Figure 3:
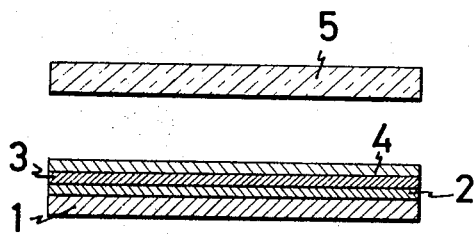
FIGS. 3 and 4 are vertical sectional views illustrating a process of pasting a printed sheet onto a lenticular screen material.
Figure 4:
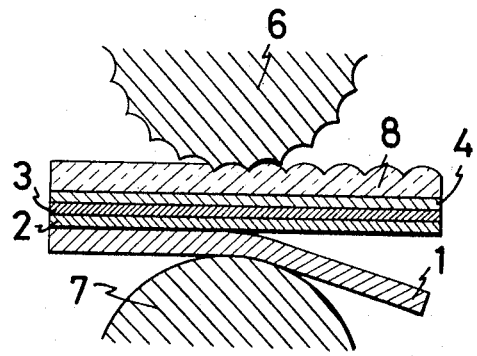

In the drawings, 1 is a plastic base sheet such as polystyrene sheet which a usual surface treatment is performed on the surface, or metallic plate, and there is provided on said sheet 1 with a coating layer 2 having a good printability. The coating layer 2 has the surface intensity as in the degree of not bringing about the pickings in the printing process, and has a proper peelability when heated. When the printing may be performed on the sheet formed by the layers 1 and 2, an image element 3 of the stereoscopic or variable picture divided into dots or stripes are provided onto the coating layer 2. In the process of the coating of a thermoplastic solvent-sensitive adhesive agent 4 on said image element 3, and said adhesive agent 4 covers over the ink film of said element 3, further permeating into said coating layer 2, and reaching the base sheet 1 being made of polystyrene or the like. As illustrated in FIG. 4, a sheet made of vinyl chloride or the like 5 is preheated by causing it to pass through a heating roll or heating plate and said printed sheet is caused to pass through the space between a lense embossing roll 6 and a pressing roll 7, the adhesion between said sheet 5 and printed sheet 1–4 is accomplished, thereafter, the base sheet 1 being made of polystyrene or the like is peeled off from the coating layer 2, thus a stereoscopic or variable picture sheet composed of a lenticular screen 8 made from the polyvinyl chloride or the like, coating layer 2, and image element 3 is obtained.

Figure 5:
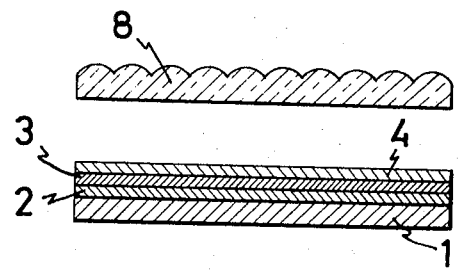
FIGS. 5 and 6 are vertical sectional views illustrating a process of adhering a printed sheet to a lenticular screen.
Figure 6:
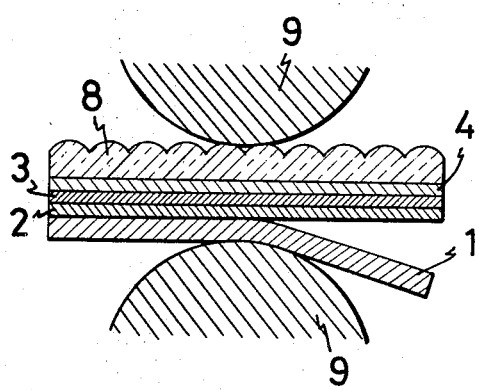

Furthermore, when a sheet 8 which has been provided with cylindrical lenses previously may be employed as the lenticular screen as illustrated in FIGS. 5 and 6, there are provided a coating layer 2 and image elements 3 on a base sheet 1, said sheet 8 is attached thereon with an adhesive layer 4. And then the base sheet 1 is peeled off by permitting it to pass through heating rolls 9 at the temperature below the softening point of the formed sheet 8.

In order to provide the coating layer which is peelable by heating, if the coating of wax, hot-melt resin and the like is made between the base sheet 1 and coating layer 2, after the adhering the sheet 5 or 8 made of vinylchloride sheet or the like to the body, the layer of wax or hot-melt resin being molten by causing said body to pass through between the heat embossing roll 6 or heating rolls 9, and the base sheet 1 can be peeled off more easily from said body as the result mentioned above.

Further, in the case of the cold-peeling, peeling can be carried out by the employment of the sheet which the adhesive intensity between the styrene sheet and coating layer may be reduced to such an extent as there is no inconvenience with regard to the printability.

In the following, some examples will be shown.

EXAMPLE 1

Paraffin wax is applied on a foamed polyester sheet of 0.075 mm. in thickness, there is provided a coating layer with using a coating solution comprising 10 parts by weight of carbonate resin, 5 parts by weight of magnesium carbonate, 5 parts by weight of titanium oxide, and 80 parts by weight of toluene, and thereafter image elements are printed thereon by offset printing and coating of a solvent-sensitive acrylic adhesive is applied thereon, then a preheated polyvinyl chloride sheet with the thickness of 0.2 mm. placed on said coated sheet. Said polyvinyl chloride sheet and coated base sheet is caused to pass through the space between a heated embossing roll and a pressing roll, wherein said two layers are adhered together, cylindrical lenses are formed on said polyvinyl chloride sheet, and the backing polyester sheet is stripped off by melting of wax.

EXAMPLE 2

A polystyrene sheet of 0.080 mm. in thickness is applied with a coating layer with using a suspension consisting of 100 parts by weight of clay, 12 parts by weight of butadiene-methylmethacrylate latex, (POLYLAC ML 505, produced by Toyo Koatsu Kogyo) and 10 parts by weight of casein. Image elements are printed by offset printing thereon, and a solution-sensitive acrylic adhesive is applied thereon, and further the above-mentioned treated sheet is attached with 0.2 mm. thickness pre-heated polyvinyl chloride sheet and passed through the embossing roll and the pressing roll. Thus said two sheets are adhered together and after the passing through the rollers, the backing polystyrene sheet is peeled off.

EXAMPLE 3

There is provided a coating layer as described in the Example 2, a solvent-sensitive acrylic adhesive is applied on a polyester sheet, and printing is performed thereon. Said sheet is then caused to contact with a 1.5 mm. thickness polyvinyl chloride sheet being formed previously cylindrical lenses on the one surface thereof, the polyester sheet is peeled off by permitting the body consisting said two sheets to pass through between the heating rolls at 80° C. below the softening point of polyvinyl chloride.

EXAMPLE 4

There is provided a coating layer on a polished steel plate of 0.1 mm. in thickness in a similar manner as described in said Example 1, thereafter similarly said plate being peeled off by melting wax after the similar application of a printing and adhering.

What is claimed is:

1. A method for producing a stereoscopic picture with a lenticular screen comprising applying a clay like coating layer on a base sheet, printing specific linear or dotted images on said coated base sheet, applying an adhesive layer on the printed base sheet, adhering said sheet onto the backside of a lenticular screen, and peeling off said base sheet from said coating layer, said coating layer having characteristics of peelability and printability, and said printed images producing stereoscopic views when observed through said lenticular screen.

2. A method for producing a picture with a lenticular screen as claimed in claim 1, said base sheet being applied having an adhesive layer is attached onto a lenticular screen material sheet, and thereafter said material sheet is embossed with a cylindrical or dotted lenses using an embossing roll.

3. A method as claimed in claim 1 wherein said coating layer is formed from a coating solution comprising carbonate resin, magnesium carbonate, titanium oxide and toluene.

4. A method as claimed in claim 3 wherein the coating solution comprises substantially ten parts by weight of carbonate resin, five parts by weight of magnesium carbonate, five parts by weight of titanium oxide and 80 parts by weight of toluene.

5. A method as claimed in claim 1 wherein the coating layer is formed using a suspension consisting of clay, butadiene-methylmethacrylate latex, and casein.

6. A method as claimed in claim 5 wherein the suspension consists of 100 parts by weight of clay, 12 parts by weight of butadiene-methyl-methacrylate latex, and 10 parts by weight of casein.

References Cited

UNITED STATES PATENTS

| | | | |
|---|---|---|---|
| 3,007,829 | 11/1961 | Akkeron | 156—230X |
| 3,036,945 | 5/1962 | Souza | 156—219X |
| 3,146,492 | 9/1964 | Lemelson | 156—209X |
| 3,264,164 | 8/1966 | Jerothe et al. | 156—209X |
| 3,445,309 | 5/1969 | Milliken | 156—240X |

SAMUEL W. ENGLE, Primary Examiner

U.S. Cl. X.R.

156—209, 247, 277; 161—33